United States Patent
Garay et al.

(10) Patent No.: US 9,366,281 B2
(45) Date of Patent: Jun. 14, 2016

(54) HOUSING WITH SELF-MOUNTING FEATURE

(71) Applicant: DELPHI TECHNOLOGIES, INC., Troy, MI (US)

(72) Inventors: Leon E. Garay, Chihuahua (MX); Aldo Ricardo Alvidrez, El Paso, TX (US); Jesus R. Morales, Chihuahua (MX)

(73) Assignee: Delphi Technologies, Inc., Troy, MI (US)

( * ) Notice: Subject to any disclaimer, the term of this patent is extended or adjusted under 35 U.S.C. 154(b) by 218 days.

(21) Appl. No.: 14/071,978

(22) Filed: Nov. 5, 2013

(65) Prior Publication Data

US 2015/0125200 A1    May 7, 2015

(51) Int. Cl.
| | |
|---|---|
| *F16B 21/00* | (2006.01) |
| *F16B 21/06* | (2006.01) |
| *B60R 16/023* | (2006.01) |
| *F16B 5/06* | (2006.01) |
| *F16B 17/00* | (2006.01) |
| *B60R 11/00* | (2006.01) |

(52) U.S. Cl.
CPC ............ *F16B 21/065* (2013.01); *B60R 16/0238* (2013.01); *F16B 5/0664* (2013.01); *F16B 17/00* (2013.01); *B60R 2011/0038* (2013.01); *B60R 2011/0059* (2013.01); *Y10T 403/1616* (2015.01); *Y10T 403/581* (2015.01)

(58) Field of Classification Search
None
See application file for complete search history.

(56) References Cited

U.S. PATENT DOCUMENTS

| | | | | |
|---|---|---|---|---|
| 4,635,809 | A  * | 1/1987 | Bachman et al. | 220/4.21 |
| 4,836,408 | A  * | 6/1989 | Roy | 220/4.02 |
| 8,045,337 | B2 * | 10/2011 | Morales et al. | 361/801 |
| 2004/0240933 | A1* | 12/2004 | Schwarz et al. | 403/316 |
| 2012/0014075 | A1* | 1/2012 | Li et al. | 361/752 |

FOREIGN PATENT DOCUMENTS

| | | |
|---|---|---|
| AU | 2003204918 A1 | 2/2004 |
| DE | 196 19 164 A1 | 11/1997 |
| EP | 0 795 090 B1 | 8/2001 |
| EP | 1 323 590 A2 | 7/2003 |
| EP | 1 387 091 B1 | 3/2005 |

OTHER PUBLICATIONS

European Search Report dated Feb. 13, 2015.

* cited by examiner

*Primary Examiner* — Victor MacArthur
(74) *Attorney, Agent, or Firm* — Robert J. Myers

(57) ABSTRACT

A housing with a self-mounting feature is provided. The housing includes a base that is configured to define a hook that cooperates with a back side of a panel and a first edge of an opening of the panel to secure the housing to a front side of the panel. The housing further includes a retainer that is operable to an un-engaged position and an engaged position. The retainer is configured to define a blocker portion that cooperates with a second edge of the opening to keep the hook adjacent to the first edge when the retainer is in the engaged position.

4 Claims, 5 Drawing Sheets

US 9,366,281 B2

HOUSING WITH SELF-MOUNTING FEATURE

TECHNICAL FIELD OF INVENTION

This disclosure generally relates to a housing for holding components or items, and more specifically relates to a housing with a self-mounting feature for securing the housing to a panel.

BACKGROUND OF INVENTION

The fuses and relays of an electrical system of a vehicle typically are contained within a housing that attaches to the vehicle. Known housing designs require the use of metal nuts and studs to secure the housing to the vehicle. An assembly tool, such as an electric or pneumatic socket driver, is typically used to tighten the nuts to the studs. One drawback of these known housing designs is the cost associated with the use of an assembly tool to secure the housing to the vehicle. Additional drawbacks include the weight and piece cost associated with the use of metal nuts and studs.

SUMMARY OF THE INVENTION

In accordance with one embodiment a housing configured to be secured to a front side of a panel is provided. The panel defines a back side opposite the front side, and an opening through the panel. The opening defines a first edge and a second edge opposite the first edge. The housing includes a base that is configured to define a hook that cooperates with the back side and the first edge to secure the housing to the front side. The housing further includes a retainer that is slideably coupled to the base and is operable to an un-engaged position and an engaged position. The retainer is configured to define a blocker portion that cooperates with the second edge to keep the hook adjacent to the first edge when the retainer is in the engaged position Further features and advantages will appear more clearly on a reading of the following detailed description of the preferred embodiment, which is given by way of non-limiting example only and with reference to the accompanying drawings.

BRIEF DESCRIPTION OF DRAWINGS

The present invention will now be described, by way of example with reference to the accompanying drawings, in which.

DETAILED DESCRIPTION

Figure 1:
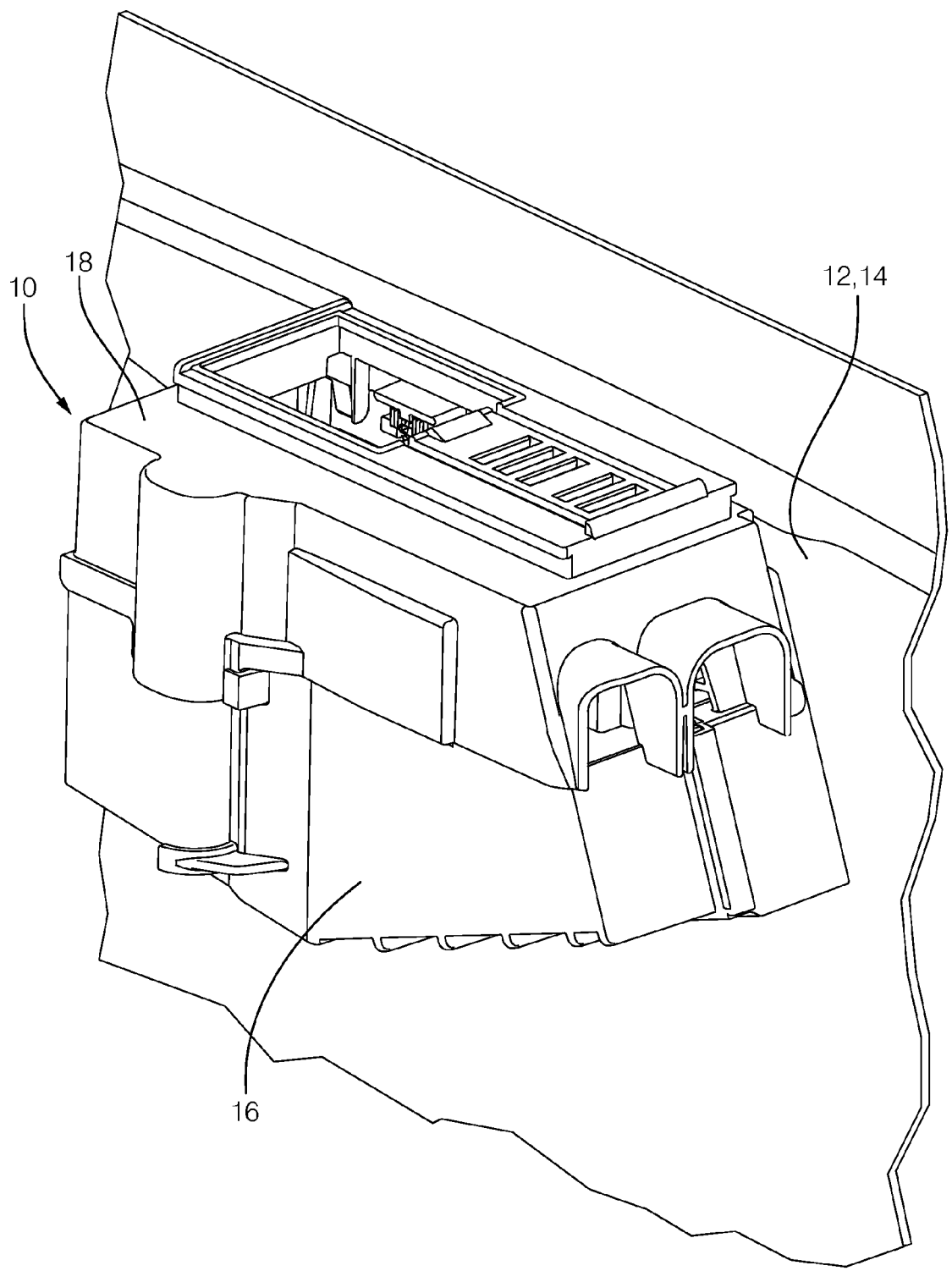
FIG. 1 is a front perspective view of a housing that is secured to a panel in accordance with one embodiment.
Figure 2:
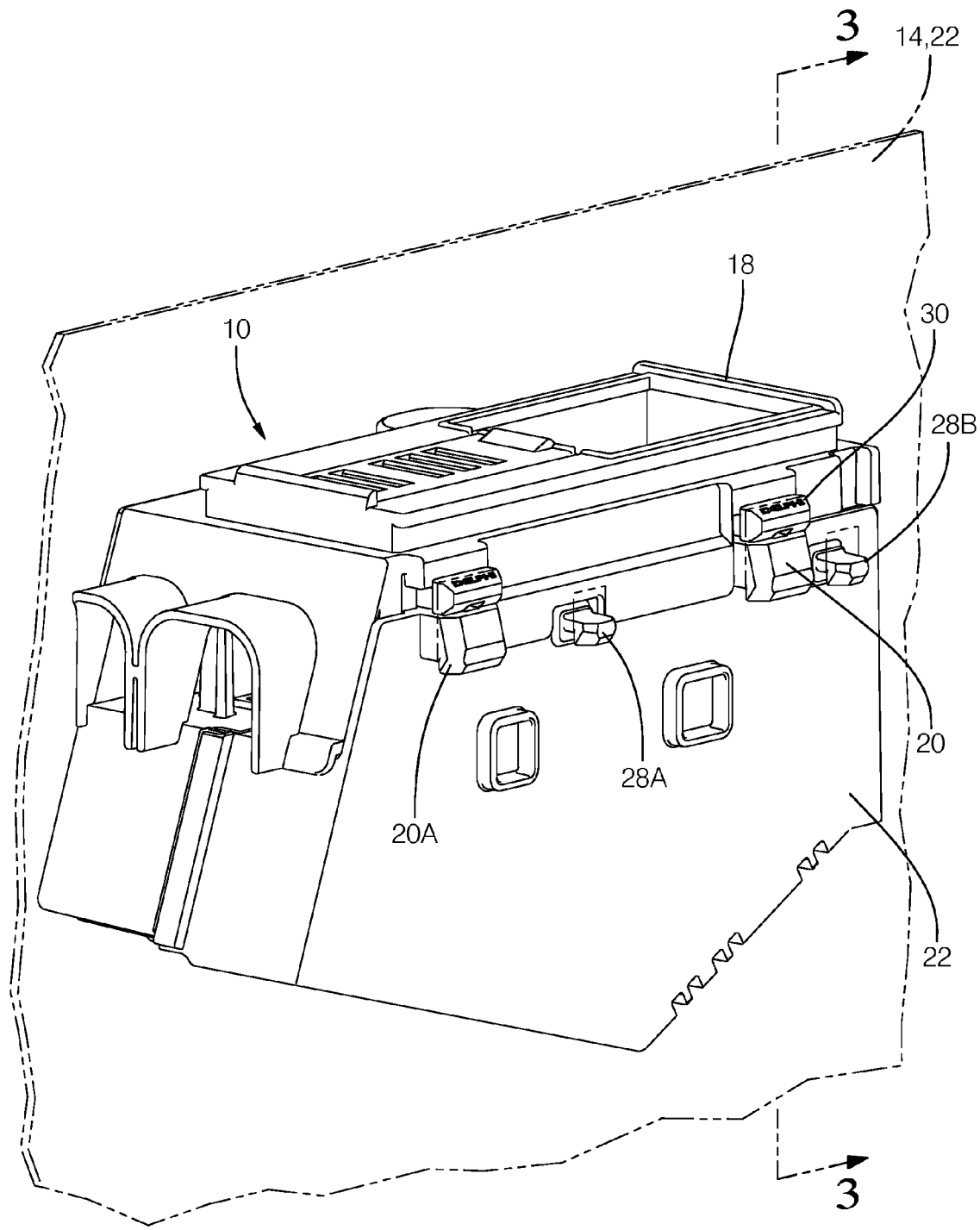
FIG. 2 is a back perspective view of the housing and panel in accordance with one embodiment.
Figure 3:
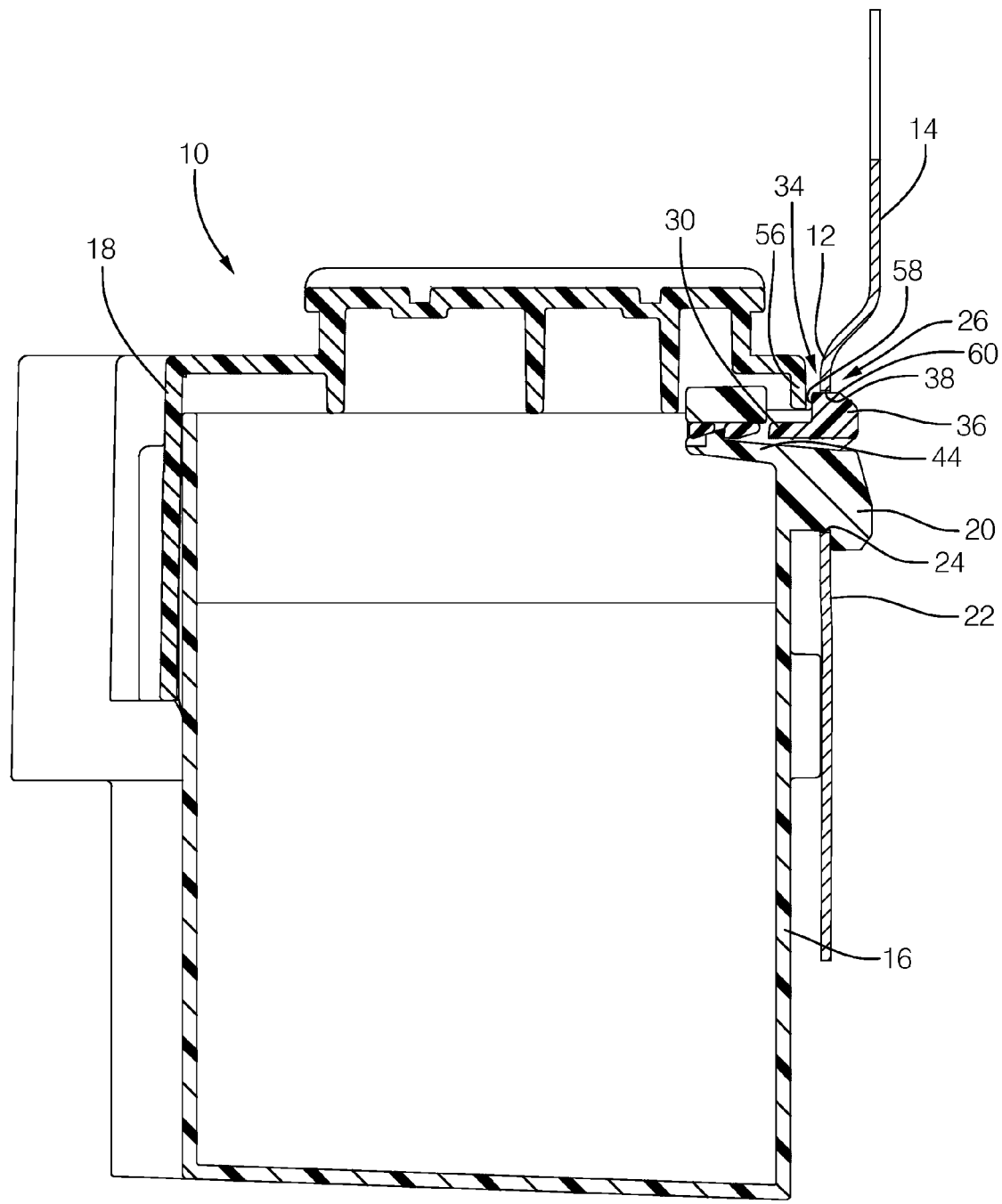
FIG. 3 is a sectional view of the housing and panel in accordance with one embodiment.
Figure 4:
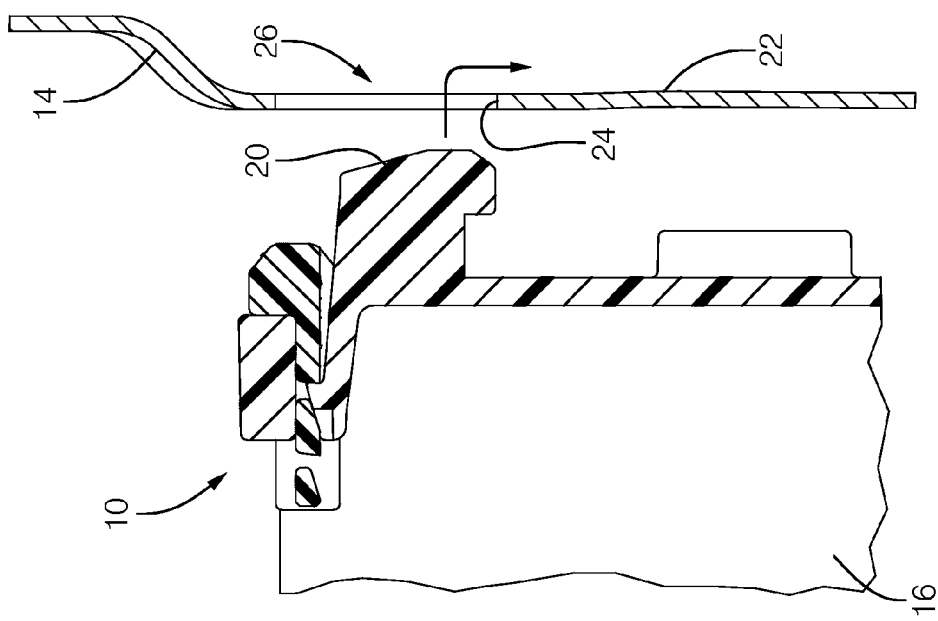
FIG. 4 is a sectional view of the housing with a cover of the housing removed that demonstrates how a hook of a base of the housing is inserted into an opening of the panel.

FIG. 1 illustrates a non-limiting example of a housing 10 configured to be secured to a front side 12 of a panel 14. The housing 10 includes a base 16 that is configured to hold the contents (not shown) of the housing 10. The housing 10 may also include a cover 18 that attaches to the base 16 and protects the contents of the housing 10. By way of example and not limitation, the contents of the housing 10 may be electrical components such as fuses and relays of an electrical system of a vehicle, and the panel 14 may be a sheet metal panel of the vehicle. The base 16 defines a hook 20 (FIG. 2) that cooperates with a back side 22 of the panel 14 and a first edge 24 (FIG. 3) of an opening 26 of the panel 14 to secure the housing 10 to the front side 12 of the panel 14. As shown in FIG. 4, the hook 20 is inserted through the opening 26 in the panel 14 in order to engage the hook 20 with the panel 14. In the example shown in FIG. 2, the base 16 also defines a hook 20A that is similar in design and function to the hook 20, and auxiliary features 28A and 28B that also hook to the panel 14. The hook 20A and auxiliary features 28A and 28B assist the hook 20 in supporting the weight of the housing 10. The base 16 and cover 18 may be made of plastic.

Figure 6:
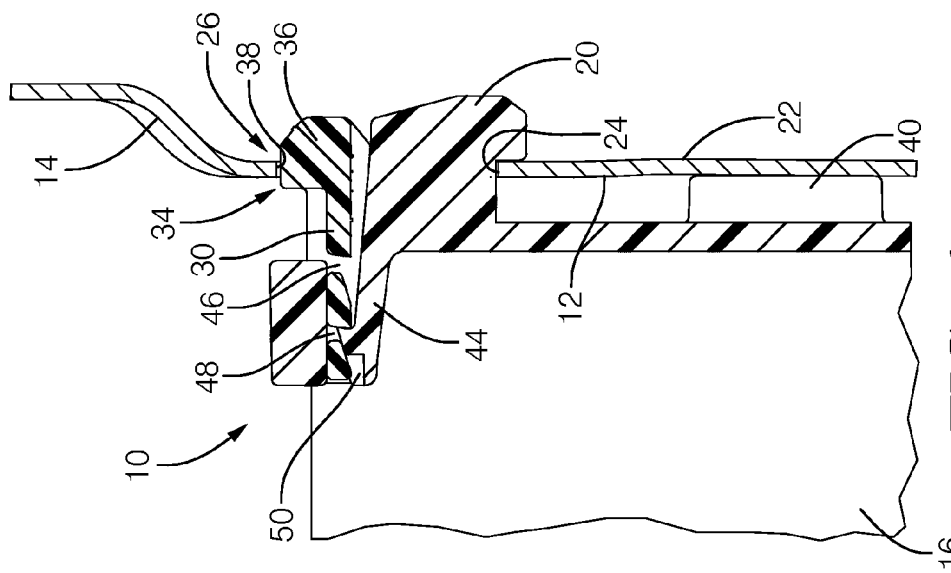
FIG. 6 is a sectional view similar to FIG. 4 with the retainer in an engaged position in accordance with one embodiment.
Figure 5:
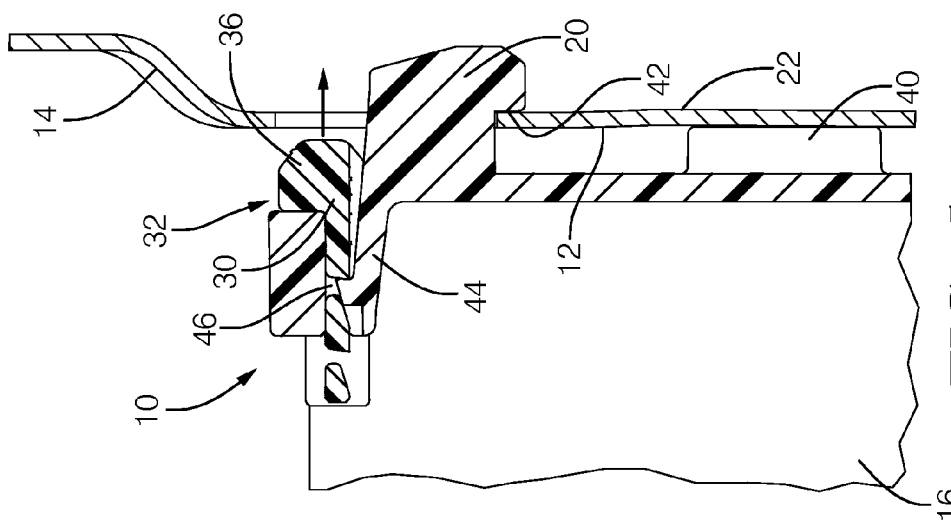
FIG. 5 is a sectional view of the housing and panel with a cover of the housing removed and a retainer of the housing in an unengaged position in accordance with one embodiment.

The housing 10 also includes a retainer 30 (FIG. 3) that is slideably coupled to the base 16. In the example shown, the retainer 30 is operable to an un-engaged position 32 (FIG. 5) and an engaged position 34 (FIG. 6) when the cover 18 is not attached to the base 16. The base 16 is secured to the panel 14 when the retainer 30 is moved from the un-engaged position 32 to the engaged position 34. The retainer 30 defines a blocker portion 36 that cooperates with a second edge 38 of the opening 26 to keep the hook 20 adjacent to the first edge 24 of the opening 26 when the retainer 30 is in the engaged position 34. The base 16 is secured to the panel 14 as a result of the hook 20 being held adjacent to the first edge 24 when the retainer 30 is in the engaged position 34. The retainer 30 may be made of plastic.

The base 16 of the housing 10 may also be configured to define a boss 40 (FIG. 5) that contacts the front side 12 of the panel 14 and cooperates with the weight of the base 16 to align a vertical surface 42 of the hook 20 with the back side 22 of the panel 14. This ensures that the vertical surface 42 of the hook 20 is aligned and engaged with the back side 22 of the panel 14 prior to the retainer 30 being moved to the engaged position 34.

The base 16 of the housing 10 may further be configured to define a clip portion 44 (FIG. 5) that engages a first slot 46 in the retainer 30 to lock the retainer 30 in the un-engaged position 32, and engages a second slot 48 (FIG. 6) in the retainer 30 to lock the retainer 30 in the engaged position 34. This locking feature ensures that the retainer 30 stays in the desired position (i.e. un-engaged position 32 or engaged position 34) prior to and after the base 16 is secured to the panel 14. The retainer 30, clip portion 44, and opening 26 may be configured such that the retainer 30 can be moved from the un-engaged position 32 to the engaged position 34 by hand (i.e. without an assembly tool).

Figure 7:
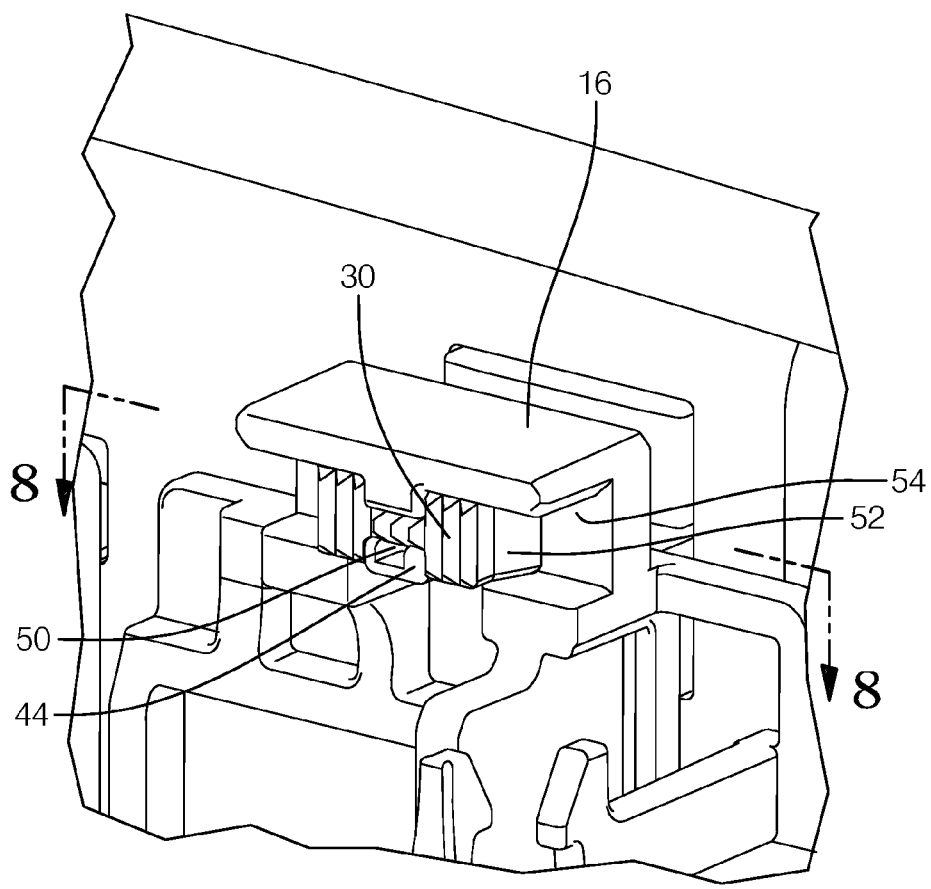
FIG. 7 is a close-up perspective view of the retainer in the engaged position in accordance with one embodiment.

The clip portion 44 of the base 16 may define an indentation 50 (FIGS. 6 and 7) that is configured to allow for access to disengage the clip portion 44 from the second slot 48. The indentation 50 allows for the retainer 30 to be unlocked from the clip portion 44 with a disassembly tool such as a screw driver with a standard head that fits within the indentation 50. With the clip portion 44 disengaged from the second slot 48, the retainer 30 may then be moved to the un-engaged position 32 unlocking the base 16 from the panel 14. This allows for removal of the base 16 from the panel 14 when or if servicing is required.

Figure 8:
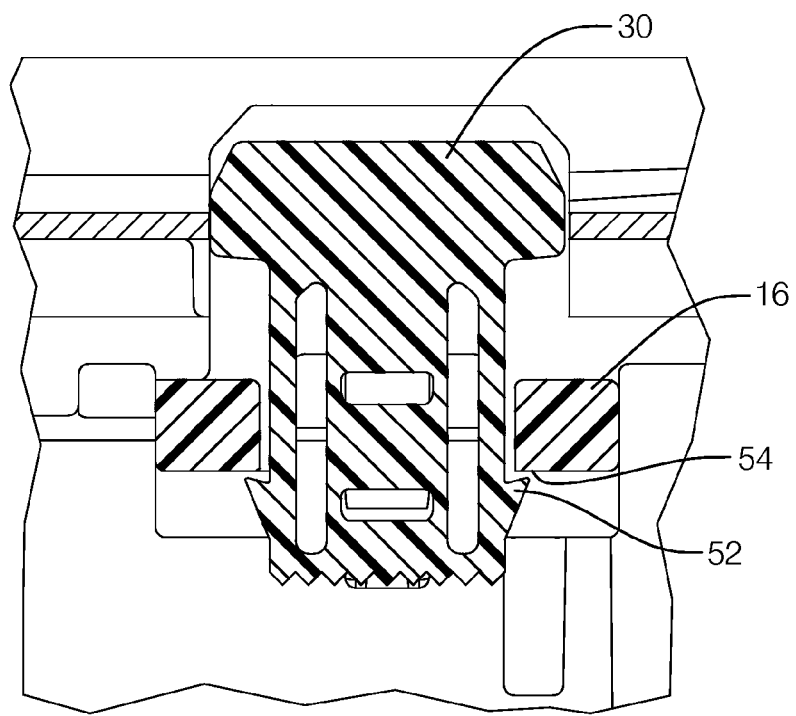
FIG. 8 is a close-up sectional view of the retainer and a base of the housing in accordance with one embodiment.

The retainer 30 of the housing 10 may be further configured to define a wing 52 (FIG. 8) that cooperates with an exposed surface 54 of the base 16 to keep the retainer 30 from being dislodged from the base 16 during shipping and handling, or after the base 16 has been secured to the panel 14.

The cover 18 of the housing 10 may be configured to define a stop 56 (FIG. 3) that cooperates with the retainer 30 to keep the housing 10 secured to the panel 14 if the retainer 30 unintentionally moves from the engaged position 34. The stop 56 cooperates with a back surface 58 of the blocker portion 36 of the retainer 30 to keep an upper surface 60 of the blocker portion 36 engaged with the second edge 38. This keeps the hook 20 adjacent to the first edge 24.

Accordingly, a housing 10 with a self-mounting feature is provided. The housing 10 provides cost and weight savings when compared to known housing designs that require metal nuts and studs along with the use of an assembly tool to secure the housing. Additionally, the housing 10 eliminates the need for access to the back side 22 of the panel 14 in order to secure the housing 10 when compared to housing designs that utilize loose nuts and bolts to secure the housing.

While this invention has been described in terms of the preferred embodiments thereof, it is not intended to be so limited, but rather only to the extent set forth in the claims that follow.

We claim:

1. A housing configured to be secured to a front side of a panel, wherein the panel defines a back side opposite the front side, and an opening through the panel, wherein the opening defines a first edge and a second edge opposite the first edge, said housing comprising:
    a base that defines a hook for cooperating with the back side and the first edge to secure the housing to the front side; and
    a retainer attached to the base and operable to an un-engaged position and an engaged position, wherein the retainer defines both a blocker portion for cooperating with the second edge to keep the hook adjacent to the first edge when the retainer is in the engaged position and a wing extending laterally from opposite sides of the retainer that cooperates with an exposed surface of the base to keep the retainer from being dislodged from the base, wherein the base further defines a clip portion that engages a first slot in the retainer to lock the retainer in the un-engaged position and engages a second slot in the retainer to lock the retainer in the engaged position.

2. The housing of claim 1, wherein the clip portion defines an indentation configured to allow for access to disengage the clip portion from the second slot.

3. The housing of claim 1, wherein the housing further comprises a cover that attaches to the base, wherein the cover defines a stop for cooperating with a back surface of the blocker portion to keep an upper surface of the blocker portion engaged with the second edge.

4. The housing of claim 1, wherein the base further defines a boss for contacting the front side and cooperating with the weight of the base to align a vertical surface of the hook with the back side.

\* \* \* \* \*